UNITED STATES PATENT OFFICE 2,657,126

POLYHALOCYCLOHEXENONE COMPOSITIONS ADAPTED FOR HERBICIDAL AND OTHER USE

William D. Stewart, Brecksville, and John H. Standen, Cleveland Heights, Ohio, assignors to The B. F. Goodrich Company, New York, N. Y., a corporation of New York No Drawing. Application March 31, 1951, Serial No. 218,694

13 Claims. (Cl. 71—2.3)

This invention relates to new and useful herbicidal compositions and other compositions adapted for agricultural and industrial use by reason of activity in killing living organisms of the plant kingdom, or in preventing or inhibiting the normal functioning thereof, and it pertains particularly to such compositions in which the essential active ingredient is a polyhalocyclohexenone containing from 6 to 8 halogen atoms attached to the cyclohexenone ring. The invention further relates to methods of treating and controlling undesirable plant life with such polyhalocyclohexenones, including the killing of growing weeds or crop plants by post-emergent application, the prevention of germination of weed seeds by pre-emergent application and the direct treatment of plant seeds before they come in contact with soil.

We have discovered that polyhalocyclohexenones containing 6 to 8 chlorine atoms attached to the cyclohexenone nucleus, possess unique herbicidal activity in that they function effectively as rapid contact herbicides killing substantially all non-woody vegetative or herbaceous plant growth to which they are applied in periods as short as 24 to 48 hours. This herbicidal activity can be most economically achieved by the use of from 0.1% to 50% by weight of the polyhalocyclohexenones in heribcidal compositions made up using any suitable inert and non-corrosive carrier, as by dispersing them in aqueous media, dispersing them in finely-divided pulverulent solids, or by dissolving them in suitable hydrocarbon solvents such as kerosene, fuel oils, diesel fuel oils and the like or in mixtures of solvent such as acetone and kerosene. Field tests have shown that a single application of such herbicidal compositions at the rate of two to twenty pounds of the active ingredient per acre will kill all plant growth except woody-tissue growth in as little as 24 to 48 hours.

We have also discovered that such polyhalocyclohexenones are effective, preferably in similar compositions also containing an inert carrier, in killing, or otherwise inhibiting or preventing the undesirable functioning of, members of the plant kingdom which are not classified as herbs. For example they are active against plants of the Myxophyta (slime molds) and Thallophyta (algae, fungi and bacteria) classes, and hence may be used as fungicides and bactericides as in preventing the mildewing and molding of textile fabrics, leather, wood and other materials subject to deterioration by fungi, bacteria and molds. They may also be effectively used as fungicides for the immunization of seeds and tubers and in the control of fungus diseases of plants, in those instances where they do not completely prevent germination of the seed or growth of the plants to which they are applied.

The polyhalocyclohexenones which can be used as active ingredients for the purposes of this invention are any of the polyhalocyclohexenones including the chloro, bromo, iodo, and fluoro cyclohexenones containing 6 to 8 halogen atoms attached to the cyclohexenone nucleus but the polychlorocyclohexenones containing 6 to 8 such chlorine atoms are preferred. All such compounds possess the general structure

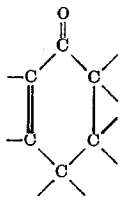

and have from 6 to 8 of the free valences attached to halogen, those not attached to halogen, if any, being attached to hydrogen or alkyl or haloalkyl groups.

The preparation of the polychlorocyclohexenones, the preferred active ingredients, is described in the literature, for example, in Berichte 37, 4017 (1904). In general they can be prepared by the chlorination of phenol or a chlorinated phenol. The literature describes a method of preparing hexachlorocyclohexenone as follows: 207 parts by weight of 2,4,6-tricholorophenol, 207 parts by weight of glacial acetic acid and 166 parts by weight of liquid chlorine are sealed in a reactor. This mixture is allowed to stand for 30 days at room temperature, shaken daily to loosen the crystals that form on the sides of the reaction vessel. Then the reactor is vented, the reaction mixture is washed with water and aqueous sodium bicarbonate solution until neutral. Then the crystalline product is recovered by filtration and dried over calcium chloride. Heptachlorocyclohexanone is prepared in a similar manner using 2,3,4,6-tetrachlorophenol.

Octachlorocyclohexenone is described as being prepared by the reaction of 190 parts by weight of pentachlorophenol with 150 parts by weight of liquid chlorine in the presence of 285 parts by weight of glacial acetic acid at room temperature over a period of 30 days in a sealed reaction vessel which is shaken daily to reloosen the crystalline product which forms on the inner walls of the reactor. After venting off the unreacted chlorine the mother liquor is filtered to recover the crystalline product formed. The beta and gamma isomers of octachlorocyclohexenone can be recovered from the mother liquor, the alpha isomer being the crystalline precipitate formed by this reaction.

Octachlorocyclohexenone can also be prepared by direct chlorination of phenol at about 130° C. The chlorination is carried out until trichlorophenol is formed and then a catalyst such as a chloride of antimony, iron or aluminum is added and the chlorination is continued until the octachlorocyclohexenone is formed. This process takes about 30 hours. This process also forms a mixture of the alpha, beta and gamma isomers primarily the alpha and beta isomers while the first process produces mainly the alpha isomer.

Other polyhalocyclohexenones containing 6 to 8 halogen atoms attached to the nucleus may be prepared in a similar manner by the halogenation of the appropriate phenol or halogenated phenol. For example cresol or halogenated cresols may be further halogenated in the manner described to yield hexahepta- and octahalo methylcyclohexenones.

In formulating the active ingredient into herbicidal and other compositions for use in this invention various procedures may be used. Herbicidal dusts containing the desired polyhalocyclohexenone can be prepared by incorporating the halocyclohexenone in a finely divided inert pulverulent solid material such as talc, diatomaceous earth, clays, calcium carbonate, inorganic silicates and the like by means of a ball mill or any other similar mixing device. Generally it will be found that the herbicidal activity of such dusts will be enhanced if a surface-active agent (wetting or dispersing agent) is also incorporated in the dust composition. Such dusts can be prepared by wetting a small amount of the pulverulent solid with an aqueous dispersion of the polyhalocyclohexenone in an aqueous solution of a surface-active agent then drying this mixture and grinding or ball milling the dry mixture with more pulverulent carrier to obtain the desired concentration of active ingredient.

Aqueous dispersions containing the polyhalocyclohexenones can be prepared by dissolving the active ingredient in a water-miscible inert organic solvent and combining with sufficient water to give the desired concentration. A concentrated solution of active ingredient in a water-immiscible organic solvent can also be combined with an aqueous solution of a surface-active agent to form an oil in water dispersion. In addition, solid polyhalocyclohexenones can be reduced to a finely-divided powdered form and then dispersed in an aqueous solution of a surface-active agent and those which are liquids can be emulsified or dispersed in an aqueous solution of a surface-active agent.

Suitable surface-active agents (dispersing or wetting agents) which can be used to prepare the above-described compositions can be typified by the following general classification:

Sodium and potassium salts of fatty acids known as soft and hard soaps; salts of disproportionated abietic acid known as rosin soaps; salts of the hydroxy aldehyde acid present in seaweed known as algin soaps; alkali casein compositions, water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble alkyl sulfonates having 10 to 18 carbon atoms in the alkyl group; water-soluble aryl sulfonate; water-soluble alkyl aryl sulfonate; water-soluble aralkyl sulfonates; water-soluble sorbitan mono-laurate, -palmitate, -stearate, and -oleate; quaternary ammonium alkyl halides; fatty acids saponified with amines and amino alcohols; blood albumen; and others. These materials are sold under numerous trade names either as pure compounds or mixtures of compounds of the same class and mixtures of these compounds with fillers or diluents.

When the above surface-active agents are employed to prepare compositions for use in this invention it will be necessary to use only from 0.01% to about 1% by weight thereof, based on the total composition, depending on their dispersing or wetting efficiency.

Suitable solvents useful in the preparation of solutions and oil in water emulsions include hydrocarbons, chlorinated hydrocarbons, alcohols, ketones and other neutral inert organic solvents or mixtures of these.

Although compositions containing the active ingredient dissolved or dispersed in any suitable carrier are effective as herbicides in greenhouse tests, it has been found definitely preferable for field use, to employ sprayable compositions containing the polychlorocyclohexenone dissolved in a solvent comprising a liquid hydrocarbon oil containing 12 to 18 carbons atoms, having a specific gravity of from 0.7 to 0.9 and having a Saybolt viscosity of not more than 85 seconds at 130° F. Examples of such hydrocarbon oils are kerosene, light fuel oil and diesel fuel oils. Hence these oils solutions containing 0.1% to 25% or more by weight of the polychlorocyclohexenones are the preferred compositions.

The following Examples I to VII are greenhouse tests which demonstrate the herbicidal activity of various polyhalocyclohexenones of this invention and which illustrate various compositions and methods employed in the application thereof.

EXAMPLE I

A solution containing 1% by weight of mixed isomeric hexachlorocyclohexenones dissolved in a mixed solvent consisting of 10 parts by weight of "Cellosolve" (monoethyl ether of ethylene glycol), 10 parts by weight of acetone and 80 parts by weight of kerosene, was sprayed on bean, tomato, cabbage, squash, oat, and radish plants growing in a greenhouse. The solution was sprayed until the plant foliage was thoroughly wet. These treated plants were given the ordinary greenhouse care thereafter. One week after this treatment all the treated plants were dead.

EXAMPLE II

Twenty tomato, onion, radish, lettuce, and wheat seeds were placed in the hexachlorocyclohexenone solution described in Example I and left there for 30 minutes. Then the seeds were removed from the solution, placed on moist filter paper in four inch moist chambers and incubated at 20° C. for four days. Only the radish seeds germinated; all the others failed to germinate.

EXAMPLE III

A solution of isomeric hexachlorocyclohexenones prepared by dissolving 1 part by weight of this active ingredient in 20 parts by weight of alcohol and then dissolving this alcohol solution in 80 parts of water containing 0.025% by weight of sodium lauryl sulfate, was sprayed on tomato, bean, cabbage, squash, oat, and radish plants in a greenhouse. Lettuce, and wheat seeds, twenty of each, were immersed in this solution for 30 minutes then incubated for four days as described in Example II. None of the seeds germinated in four days. All the plants treated were dead one week after treatment.

EXAMPLE IV

Solutions of the alpha isomer of octachlorocyclohexenone (M. P. 103.5° to 104° C.) in deobase, an insecticide grade of kerosene, containing 0.1% and 1% by weight of this active ingredient and a solution containing 1% by weight of this alpha isomer in a mixed solvent containing 20% by weight of acetone and 80% by weight of kerosene, were each sprayed on tomato, bean, cabbage, squash, oat, and radish plants until the plants were thoroughly wet. One week after treatment the plants sprayed with each of the three different solutions were observed and found to be dead.

EXAMPLE V

Twenty seeds of each of tomato, onion, radish, lettuce, and wheat where immersed in a 1% by weight solution of alpha octachlorocyclohexenone in deobase, an insecticide grade of kerosene, for 30 minutes and twenty seeds of each of the same plants were also immersed for 30 minutes in a 1% by weight solution of alpha octachlorocyclohexenone in a mixed solvent containing 20% by weight of acetone and 80% by weight of kerosene. The seeds of each species receiving a single treatment were placed on moist filter paper in a four-inch moist chamber and incubated for four days at 20° C. to induce germination. After incubation the seeds were examined for germination. It was found that of the seeds treated with the kerosene solution only tomato, radish and lettuce seeds germinated while of the seeds treated with the acetone-kerosene solution only lettuce and radish seeds germinated.

EXAMPLE VI

A kerosene solution containing 0.1% by weight of a mixture of the beta-octachlorocyclohexenone isomer (M. P. 89.5° to 90° C.) and the gamma octachlorocyclohexenone isomer (M. P. 88° to 89° C.) was sprayed on bean, tomato, cabbage, squash, oats, and radish plants growing in the greenhouse. The spray was applied until the plant foliage was thoroughly wet. Seven days after treatment all the plants were dead.

EXAMPLE VII

A kerosene solution of the beta and gamma isomers of octachlorocyclohexenone described in Example VI was sprayed on bluegrass, bean, tomato, and radish plants growing in a greenhouse in flats containing unsterilized soil, that is, the flats contained soil in which there was present the usual mixture of weed seeds found in garden soils. All the plants in the flats, including weed plants of various varieties, were sprayed until they were thoroughly wet. These flats were observed daily. Two days after being sprayed, all the plants except the bean plants, but including the weed plants, were dead. The bean plants were severely injured and were dead when observed the morning of the fourth day after treatment.

The following Examples VIII to XII were taken from field tests which illustrate the activity of the herbicidal compositions of this invention under natural growing conditions.

EXAMPLE VIII

Spinach, egg plant and crabgrass plants in a garden plot were sprayed with a kerosene solution containing 0.1% by weight of the alpha isomer of octachlorocyclohexenone. Three days after treatment all of the treated plants were dead.

EXAMPLE IX

Perennial rye grass was sprayed with a kerosene solution of the alpha isomer of octachlorocyclohexenone at the rate of 100 gallons of spray per acre and 5 and 10 pounds of active ingredient per acre. Seventeen days after treatment the live rye grass in the plots treated was clipped at ground level and weighed. The average weight of rye grass per square foot in the plot treated with 5 pounds per acre of active ingredient was 7.6 grams, in the plot treated with 10 pounds per acre of active ingredient was 6.8 grams, while in an untreated plot used as a control there was 103 grams.

EXAMPLE X

Mature weeds along a railroad right of way were sprayed with an oil solution containing 20 pounds of a mixture of the three isomers of octachlorocyclohexenone dissolved in 125 gallons of Sun Solvent 164, a light petroleum oil diesel fuel extract, at the rate of 125 gallons of spray per acre. Three days after spraying all the plants except woody tissue plants were dead.

EXAMPLE XI

Mature narow leaf and broad leaf plants growing in an unimproved pasture were sprayed with light petroleum oil solutions of isomeric hexachlorocyclohexenones and octahlorocyclohexeones. Varying rates of application of these two active ingredients were employed. Applications were made at the rate of from five to twenty-five pounds of the active ingredient per acre, this amount of active ingredient being dissolved in 100 gallons of pale paraffin base oil having a specific gravity of 0.88, a Saybolt viscosity at 130° F. of 60 seconds and a flash point of 330° F. to 340° F. In the areas treated with 20 to 25 pounds per acrs of these two active ingredients all the plants except woody tissue plants were dead four hours after treatment. In the areas treated with 15 to 20 pounds per acre, the plants were dead in 48 hours. In the areas treated with 5 to 15 pounds per acre the plants were dead three days after treatment. The plants present in this test plot were:

| Narrow Leaf | Broad Leaf |
|---|---|
| Barnyard grass | Knotweed |
| Blue grass | Lambsquarters |
| Velvet grass | Ragweed |
| Crab grass | Moneywort |
| Wire grass | Pig weed |
| Sedges | Galinsoga |
| Hairy foxtail grass | Purslane |
|  | Goldenrod |
|  | Wild aster |
|  | Dandelion |
|  | Broad and narrow leaf plantain |
|  | Chickweed |
|  | Clover |

EXAMPLE XII

An area of the unimproved pasture described in Example XI was plowed and prepared as a seed bed but was not planted to a crop. Isomeric octachlorocyclohexenones and isomeric hexachlorocyclohexenones each dissolved in the oil solvent of Example XI were applied as pre-emergent herbicides each at four concentrations, 2.5, 5.0, 10 and 20 pounds per acre to plots of equal area. Each spray was applied to four different plots and corresponding check or control plots were left untreated. The active ingredients were applied as oil solutions in "Sun Solvent 164." Thirteen weeks after treatment the plants which emerged in each block were clipped off at ground level, counted, dried at 40° C. for 48 hours, and were weighed. In counting the plants all broad leaf plants were counted together and all narrow leaf plants were counted together. No separate count of each single species was made The average results obtained from the four replications is tabulated below:

*Pre-emergent herbicidal test*

|  | Octachlorocyclohexenones |  |  |  | Hexacyclohexenones |  |  |  | Control |
|---|---|---|---|---|---|---|---|---|---|
| Rate of Application lbs./A | 2.5 | 5.0 | 10 | 20 | 2.5 | 5.0 | 10 | 20 | ----- |
| No. Broad leaf plants/4 sq. ft | 42 | 40 | 40 | 38 | 75 | 75 | 45 | 15 | 591 |
| No. Narrow leaf plants/4 sq. ft | 275 | 225 | 200 | 175 | 210 | 180 | 120 | 48 | 664 |
| Total weight of plants gms./4 sq. ft | 187 | 171 | 169 | 151 | 92 | 82 | 75 | 46 | 334 |

The species of weeds in the control plots were the same as those present in the field tests of Example XI. The above pre-emergent test indicates that the polychlorocyclohexenones possess excellent pre-emergent herbiciday activity.

Although in the above Examples relatively large volumes of spray were applied using an ordinary nozzle sprayer and a dilute solution of the active ingredient in the oil solvent it is possible to employ solutions containing 25 to 50% or more by weight of the active ingredient applied with mist or fog type sprayers which use air as part of the carrier means. Such sprayers can uniformly apply such quantities of the active ingredients as 2.5 lbs., 5.0 lbs., 10 lbs., 15 lbs., etc. per acre even though rather concentrated solutions are employed.

The following Examples XIII to XV illustrate the use of the active ingredients of this invention to control fungi.

EXAMPLE XIII

Grains of wheat containing 15% to 16% by weight of moisture were treated with two parts by weight of a solution containing 1% by weight of actachlorocyclohexenone dissolved in acetone for each 100 parts by weight of grain. After two weeks in storage at temperatures between 70° and 75° F. the grain was examined for mildew. No mildew was present in the treated grain. The grain which had received no fungicidal treatment had mildewed.

EXAMPLE XIV

Pea seeds, var. Blue Bantam, were mixed with dust containing 20% by weight of octachlorohexenone on an inorganic silicate as a carrier at the rate of 0.3125 grams of the dust per 100 pea seeds. Pea seeds of the same variety were treated with a dust containing 20% by weight of hexachlorocyclohexenone in the same manner. These treated pea seeds and untreated pea seeds were planted in a marked plot in moist soil known to be infected with rot-producing bacteria and fungi. Over 90% of the seeds treated with octachlorocyclohexenone and hexachlorocyclohexenone had germinated ten days after planting whereas a large percentage, over 50%, of the untreated pea seeds had rotted.

EXAMPLE XV

Samples of cotton duck belting 1.5" wide and 4" long were soaked for one hour in an acetone solution containing 1% by weight of each of hexachlorocyclohexenone, heptachlorocyclohexenone and octachlorocyclohexenone. Samples of cotton duck belting of the same size were soaked for one hour in acetone. All the samples were marked to identify the treatment received. The samples were air dried and buried in moist humus. After being buried for 14 days at a temperature of 80° F., the samples were removed from the humus and their tensil strength was determined. The samples treated with octachlorocyclohexenone had an average tensile strength of 100 pounds per square inch. The samples treated with hexachlorocyclohexenone and heptachlorocyclohexenone had an average tensile strength of 93 pounds per square inch while the samples treated only with the solvent were so completely decomposed by the microorganisms in the soil that they disintegrated untouched and hence had no strength at all. The tensile strength of the belting before soil burial was 350 pounds per square inch.

Aqueous dispersions of polychlorocyclohexenones when employed in place of solutions, for the purposes described in the above three examples, will give substantially the same results.

Having disclosed our invention and illustrated various modifications thereof together with specific uses by way of specific examples, it is not out desire to limit ourselves solely thereto for as hitherto stated equivalent carriers and equivalent active ingredients can be employed if desired without departing from the spirit and scope of our invention as defined in the appended claims.

We claim:

1. A herbicidal composition which comprises as the essential active ingredient from 0.1% to 50% by weight of a polyhalocyclohexenone containing 6 to 8 halogen atoms attached to the cyclohexenone nucleus of the structure

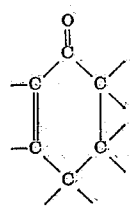

and an inert carrier therefor.

2. A herbicidal composition which comprises as the essential active ingredient from 0.1% to 50% by weight of a polychlorocyclohexenone containing 6 to 8 chlorine atoms attached to the cyclohexenone nucleus of the structure

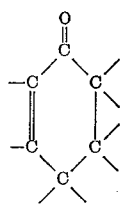

and as a carrier therefor a liquid hydrocarbon oil containing 12 to 18 carbon atoms, having a specific gravity of from 0.7 to 0.9, and having a Saybolt viscosity of not more than 85 seconds at 130° F.

3. A herbicidal composition which comprises as the essential active ingredient from 0.1% to 50% by weight of octachlorocyclohexenone and as a carrier therefor a liquid hydrocarbon oil containing 12 to 18 carbon atoms, having a specific gravity of from 0.7 to 0.9 and having a Saybolt viscosity of not more than 85 seconds at 130° F.

4. A herbicidal composition which comprises as the essential active ingredient from 0.1 to 50% by weight of hexachlorocyclohexenone and as a carrier therefor a liquid hydrocarbon oil containing 12 to 18 carbon atoms, having a specific gravity of from 0.7 to 0.9 and having a Saybolt viscosity of not more than 85 seconds at 130° F.

5. A composition adapted for agricultural and industrial use by reason of activity against living organisms of the plant kingdom, said composition comprising from 0.1 to 50% by weight of a polyhalocyclohexenone containing from 6 to 8 halogen atoms attached to the cyclohexenone nucleus of the structure

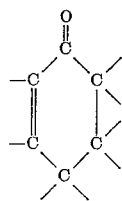

and an inert carrier therefor.

6. The method of inhibiting plant growth which comprises treating plant life with a polyhalocyclohexenone containing 6 to 8 halogen atoms attached to the cyclohexenone nucleus of the structure

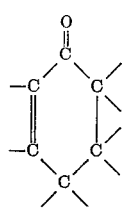

7. The method of inhibiting plant growth which comprises treating plant life with a polychlorocyclohexenone containing 6 to 8 chlorine atoms attached to the cyclohexenone nucleus of the structure

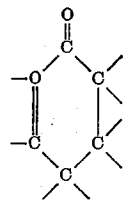

8. The method of killing vegetative plant growth which comprises applying to said plant growth a solution of a polyhalocyclohexenone containing 6 to 8 halogen atoms attached to the cyclohexenone nucleus of the structure

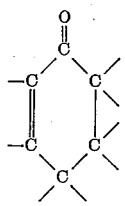

dissolved in a liquid hydrocarbon oil containing 12 to 18 carbon atoms, having a specific gravity of from 0.7 to 0.9 and having a Saybolt viscosity of not more than 85 seconds at 130° F.

9. The method of killing vegetative plant growth which comprises applying to said plant growth a solution of a polychlorocyclohexenone containing 6 to 8 chlorine atoms attached to the cyclohexenone nucleus of the structure

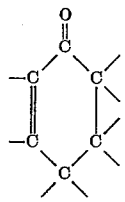

dissolved in a liquid hydrocarbon oil containing 12 to 18 carbon atoms, having a specific gravity of from 0.7 to 0.9 and having a Saybolt viscosity of not more than 85 seconds at 130° F.

10. The method of killing vegetative plant growth which comprises applying to said plant growth a solution of octachlorocyclohexenone dissolved in a liquid hydrocarbon oil containing 12 to 18 carbon atoms, having a specific gravity of from 0.7 to 0.9 and having a Saybolt viscosity of not more than 85 seconds at 130° F.

11. The method of killing vegetative plant growth which comprises applying to said plant growth a solution of hexachlorocyclohexenone dissolved in a liquid hydrocarbon oil containing 12 to 18 carbon atoms, having a specific gravity of from 0.7 to 0.9 and having a Saybolt viscosity of not more than 85 seconds at 130° F.

12. The method of controlling weeds which comprises applying to an area containing weed seeds a solution of a polychlorocyclohexenone containing 6 to 8 chlorine atoms attached to the cyclohexenone nucleus of the structure

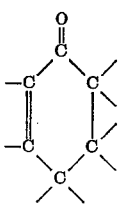

dissolved in a liquid hydrocarbon oil containing 12 to 18 carbon atoms, having a specific gravity of 0.7 to 0.9 and having a Saybolt viscosity of not more than 85 seconds at 130° F.

13. The method of controlling mildew on textile fabric which comprises applying to the fabric a polychlorocyclohexenone containing 6 to 8 chlorine atoms attached to the cyclohexenone nucleus of the structure

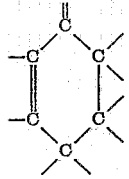

WILLIAM D. STEWART.
JOHN H. STANDEN.

References Cited in the file of this patent

UNITED STATES PATENTS

| Number | Name | Date |
|---|---|---|
| 2,314,362 | Mills | Mar. 23, 1943 |
| 2,378,597 | Ter Horst | June 19, 1945 |
| 2,396,468 | Ladd | Mar. 12, 1946 |
| 2,430,017 | Houk | Nov. 4, 1947 |
| 2,486,961 | Meyer | Nov. 1, 1949 |

OTHER REFERENCES

Di Prima, Chemical Abstracts (1950), Col. 8037.